(12) United States Patent
Isoda et al.

(10) Patent No.: US 6,701,893 B2
(45) Date of Patent: Mar. 9, 2004

(54) ENGINE CONTROL METHOD AND DEVICE FOR A SMALL VEHICLE (75) Inventors: Naoyo Isoda, Shuuchi-gun (JP); Masahiko Enoyoshi, Shuuchi-gun (JP)

(73) Assignee: Kabushiki Kaisha Moric, Shuuchi-gun (JP)

( * ) Notice: Subject to any disclaimer, the term of this patent is extended or adjusted under 35 U.S.C. 154(b) by 0 days.

(21) Appl. No.: 10/064,507

(22) Filed: Jul. 23, 2002

(65) Prior Publication Data

US 2003/0029419 A1 Feb. 13, 2003

(51) Int. Cl.$^7$ ................................................. F02P 5/145
(52) U.S. Cl. ................................... 123/406.25; 123/436
(58) Field of Search ........................... 123/406.24, 436, 123/406.25

(56) References Cited

U.S. PATENT DOCUMENTS

| | | | | |
|---|---|---|---|---|
| 4,527,523 A | * | 7/1985 | Daumer et al. ........ | 123/406.24 |
| 4,852,537 A | * | 8/1989 | Nagano et al. ........ | 123/406.25 |
| 4,928,652 A | * | 5/1990 | Shinya et al. .......... | 123/406.24 |
| 5,086,741 A | * | 2/1992 | Nakamura et al. ..........| 123/436 |
| 5,681,239 A | * | 10/1997 | Toukura ................ | 123/406.51 |
| 6,023,651 A | * | 2/2000 | Nakayama et al. ........ | 123/436 |
| 6,234,145 B1 | * | 5/2001 | Shomura ................ | 123/406.25 |
| 6,343,586 B1 | * | 2/2002 | Muto et al. ............ | 123/406.25 |
| 2002/0016666 A1 | * | 2/2002 | Maegawa ............... | 123/406.24 |

* cited by examiner

Primary Examiner—Erick Solis
(74) Attorney, Agent, or Firm—Ernest A Beutler (57) ABSTRACT Two embodiments of engine speed control that avoid undesirable vehicle conditions such as wheel slippage or unintentionally performing a wheelie. This is done by sensing actual conditions, which are likely to result in the undesirable vehicle conditions and only changing the engine output when these exact conditions are found. The conditions sensed are the determination of excessive acceleration in engine speed or in the speed of a shaft associated with the engine or the degree of rotational variation or rotational acceleration.

22 Claims, 7 Drawing Sheets

ENGINE CONTROL METHOD AND DEVICE FOR A SMALL VEHICLE

BACKGROUND OF INVENTION

This invention relates to an engine control method and engine control structure for a small vehicle and more particularly to an improved engine control that prevents unwanted vehicle performance such as wheel slippage or undue lifting of a vehicle wheel from the ground without adversely affecting performance.

In certain types of small vehicles such as motorcycles or motor scooters, there has been a problem in that if rapid acceleration occurs, either or both of two undesirable phenomena result. One is slippage of the rear wheel that results in the loss of traction for driving and the other is a condition where there acceleration is so rapid that the front wheel actually may lift from the ground causing a phenomenon referred as to performing a "wheelie". Neither result is desirable.

It has been proposed, therefore, to provide an arrangement wherein the engine output is reduced under situations where these conditions are likely to occur. The engine power reduction may be accomplished in a variety of manners such as changing ignition timing, skipping ignition timing or others.

Normally this condition is determined by sensing when the acceleration of the vehicle or a component of the vehicle exceeds a predetermined value. If this value is exceeded, then the power is reduced and the condition avoided.

However, the prior art methods of accomplishing this result are based upon acceleration alone and power reduction may occur even though it is not necessary to produce the aforenoted affects. For example, if the vehicle is being accelerated in downhill travel, the acceleration necessary to cause wheel slippage or a wheelie to occur is considerably different than that when traveling on an uphill condition.

Figure 1:
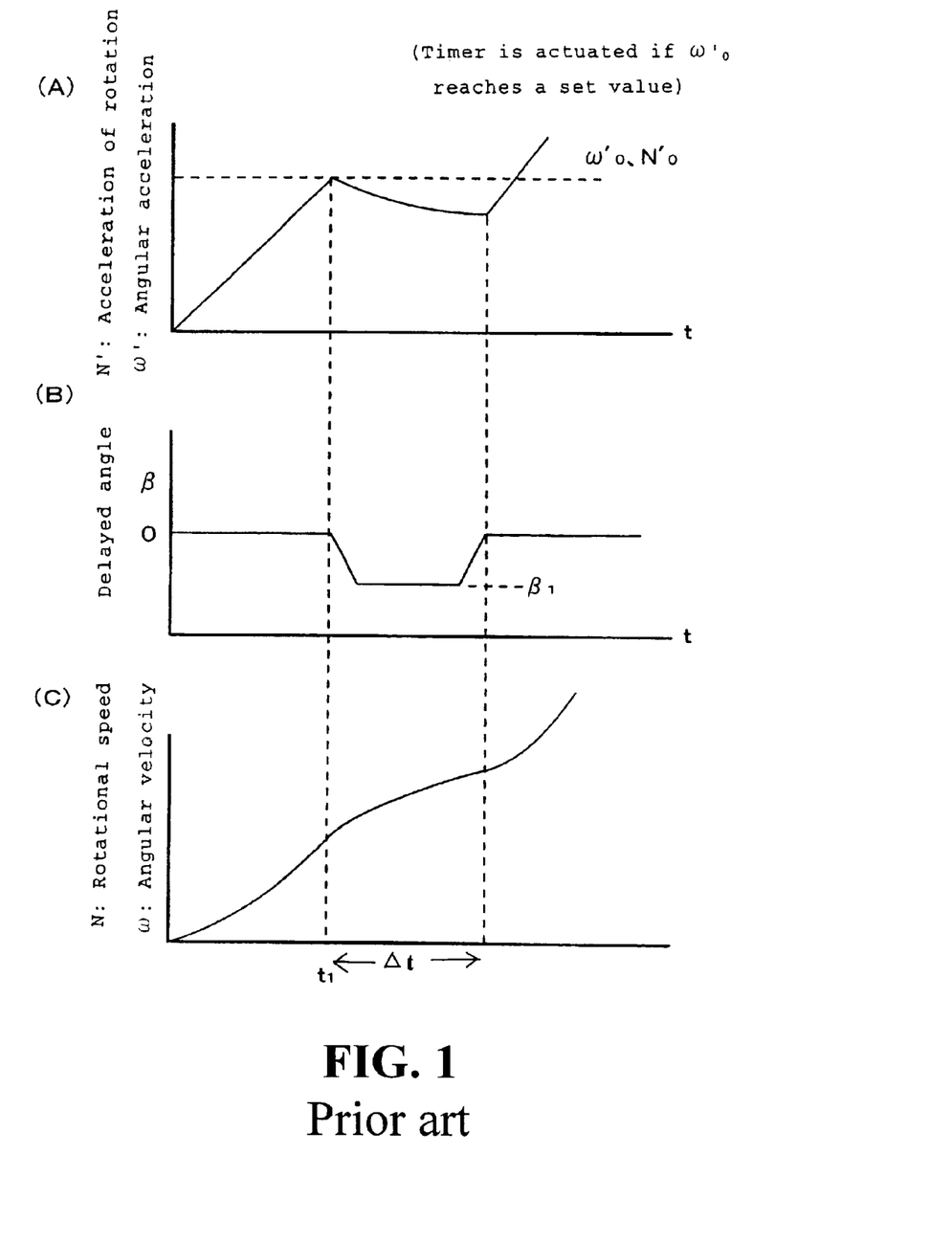
FIG. 1 is a graphical view showing a prior art type of vehicle engine control. View A shows time and shaft rotational and angular acceleration. View B shows ignition timing with relation to time. View C shows actual rotational speed and angular velocity with relation to time.

FIG. 1 is a graphical view showing how these prior art type of systems operate. The top curve of this (A) is the acceleration of the vehicle, which can either be in the form of acceleration of the rotational speed of a shaft of the vehicle as N" or the angular acceleration of the shaft indicated as $\omega$".

If these accelerations exceed a predetermined value indicated at $N'_o$ or $\omega'_o$ which occurs at the time $t_1$ as shown in the graphs, then the engine speed or power output is reduced, for example by delaying the spark timing from a normal angle $\beta$ O to a retarded angle $\beta_1$. This retardation is normally held for a predetermined time period as indicated by the timing period $\Delta$ t.

Then the spark timing is returned to its normal timing either abruptly or gradually as shown in the timing curve B of this figure. The acceleration of the shaft again increases but does not reach the level prior to application of control for some time. However, as noted above, it is found that this results in unnecessary and at times detrimental loss of engine performance.

In addition to the condition noted above i.e. traveling on a grade, it has been discovered that other conditions may occur when the acceleration exceeds the predetermined degree of acceleration used in the prior art methodology but the aforenoted undesirable driving conditions do not result. For example, if the throttle is moved relatively slowly, as may occur when traveling downhill, the acceleration rate can still exceed that preset and power is unnecessarily reduced with the prior art methods and systems. Also, if the throttle grip is moved rapidly from the closed position to a partially opened position or quickly from the partially opened position to a fully opened position, the acceleration rate of the prior art methods may be exceeded but the running conditions are such that the undesirable vehicle conditions will not occur. Thus, performance is inadvertently and unnecessarily decreased with the prior art methods and systems.

It is, therefore, a principal object to this invention to provide an improved method for engine control for a vehicle that will reduce the power but only at times when undesirable vehicle conditions will occur.

It is a further object to this invention to provide an engine control arrangement and method wherein the power is reduced only under certain specific conditions when it will be certain that undesirable vehicle running conditions may occur.

SUMMARY OF INVENTION

A first feature of this invention is adapted to be embodied in an engine control method for a vehicle in which rotation of an internal combustion engine shaft is transmitted to a driven wheel through a transmission. The method comprises the steps of detecting variations in the rotational state of the shaft during engine acceleration, determining if the degree of rotational variation is excessive, and restricting engine output if the rotational state of the shaft is excessive.

Another feature of the invention is adapted to be embodied in a vehicle engine control. The vehicle has an internal combustion engine, a driven wheel and a transmission for driving the driven wheel from a shaft of the internal combustion engine. An engine control detects variations in the rotational state of the shaft during engine acceleration. If the engine control determines the degree of rotational variation is excessive, the engine output is reduced.

DETAILED DESCRIPTION

Figure 2:
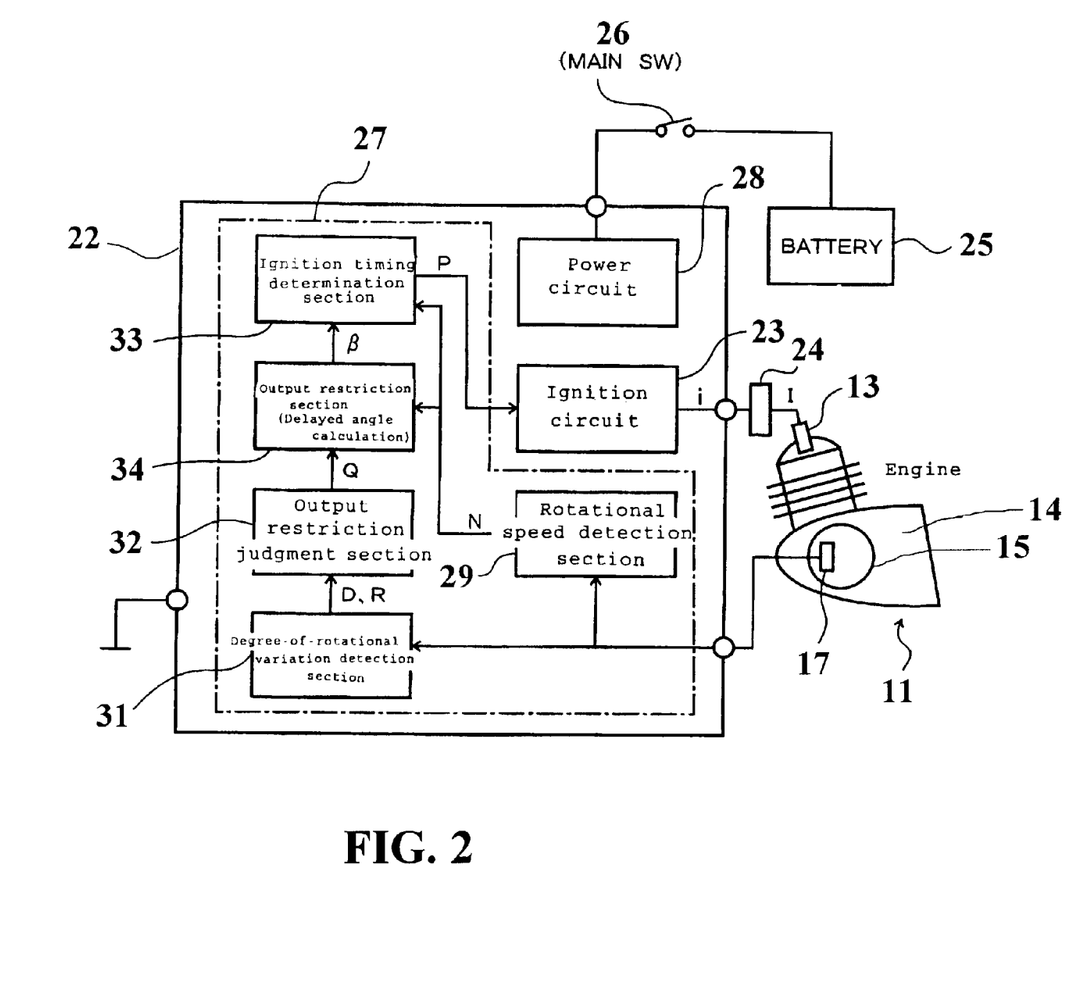
FIG. 2 is a schematic view of an engine control constructed and operated in accordance with an embodiment of the invention.
Figure 3:
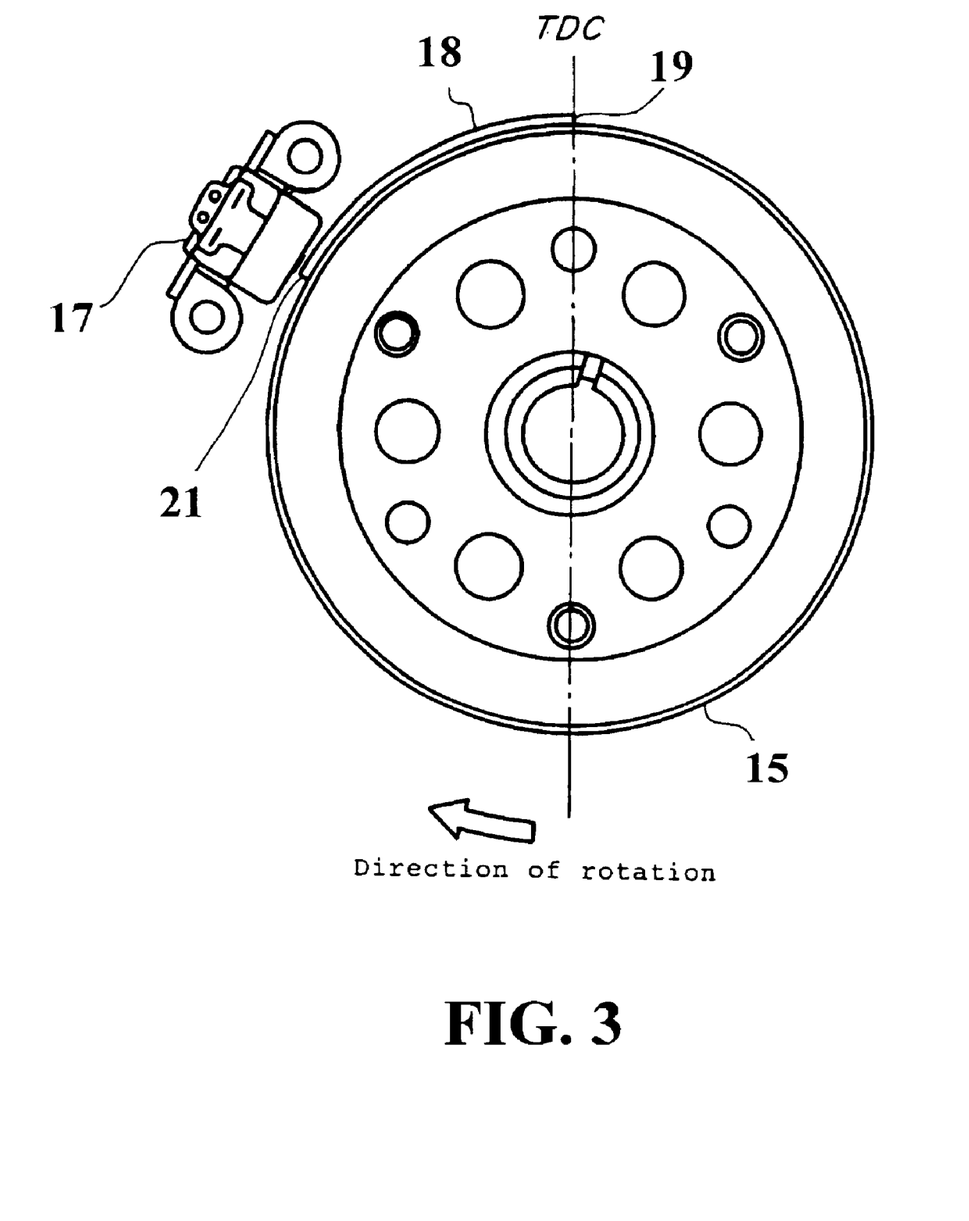
FIG. 3 is a view showing the timing sensor associated with the engine shaft for the control system.

Referring now in detail to the drawings and initially primarily to FIGS. 2 and 3, these figures illustrate a control system and control method for a vehicle such as a motor scooter or small motorcycle. Although the invention is described in conjunction with such vehicles, it should be readily apparent to those skilled in the art that other vehicular applications of the invention are possible. Also, since the construction of the associated vehicle forms no part of the invention, the complete vehicle is not illustrated. Rather, the drawings illustrate only the engine and the transmission system associated with it, which drives a driven wheel of the vehicle through a suitable drive such as a continuously variable belt type transmission, a change speed transmission or any other type of transmission.

The internal combustion engine is indicated generally by the reference numeral 11 and includes a cylinder block 12 having one or more cylinders, which are spark, ignited by spark plugs 13. As is typical in the practice with this type of vehicle, the cylinder block 12 extends from a crankcase assembly 14 in which a transmission may be positioned or, alternatively, an engine flywheel 15 powers the vehicle through an associated transmission system, which is not shown.

Since the invention deals primarily with the engine control and this engine control can be utilized with a wide variety of types of engines and transmissions, these components are not illustrated in any significant detail or, in fact, may not even be shown.

The control system for controlling the firing of the spark plug 13 will be described in more detail. The engine 11 has a crankshaft 16 to which the flywheel 15 is affixed for rotation in a known manner. Although the invention is depicted in association with a crankshaft positioned sensor, it may be associated with any other shaft that is driven by the engine in timed relation.

A pulser type sensor 17 is associated with the flywheel 15 and specifically with a timing mark 18 affixed to its outer peripheral surface. The timing mark 18 has a leading edge 19 and a trailing edge 21 which, when passing the sensor 17 will output pulses that can be measured so as to measure the time it takes the timing mark 18 to pass the sensor 17. This constitutes an instantaneous rotational speed for the engine 11 during a portion of a complete rotation.

The timing mark 18 is considerably wider, in accordance with the invention, than those normally used. Such widening is not necessarily required, but can improve the control. For example the width of the mark 18 be equal to 60° of crankshaft rotation. The timing mark is set so that it will first trigger a pulse as the engine begins to approach top dead center (TDC) position and another pulse after the crankshaft is at or near top dead center. The specific angles may vary depending upon the particular application.

Nevertheless, if the engine 11 operates on a four-stroke operation, these pulses are generated at the end of the compression and exhaust strokes. Prior art methods may have utilized speed measurements at the power stroke, but it has been found that the compression and exhaust stroke are much more accurate in providing an indication of engine load and this constitutes one of the features of the invention.

With a two cycle engine the two measurements per revolution will provide adequate information for engine control on the next revolution.

As seen in FIG. 2, the output from the sensor 17 is delivered to an engine system ignition timing control device 22, which contains an ignition circuit 23 which can be basically a conventional ignition circuit of the CDI type, which outputs a signal, "i" to a coil 24 that outputs a pulse "I" for firing the spark plug 13 in a known manner.

This engine timing control device 22 is powered with electrical power from a battery 25 through a main switch 26. The ignition timing control device 22 includes an electronic circuit 27 constituted by a microcomputer or the like, and the ignition circuit 23 consisting of a CDI (capacitor discharging ignition circuit), and a power circuit 28. The power circuit 28 is formed by a constant voltage circuit for outputting power source voltages for the ignition circuit 23 and the electronic circuit 16.

The output from the sensor 17 is transmitted to a rotational speed detection section 29 of the engine system ignition timing control device 22 and specifically the electronic circuit, which outputs a signal N indicative of the rotational speed of the engine 11 during each complete revolution cycle. In addition, the outputs from the leading and trailing edges 19 and 21 of the timing mark 18 registered on the sensor 17 are transmitted to a degree of rotational variation detection section 31. This rotational variation detection section 31 outputs a signal indicative of the speed difference to an output restriction judgment section 32.

In the described embodiment, the flywheel 15 may be formed of a magnetic material, and the sensor or coil 17 faces the rotational locus of the timing mark 18. In this case, opposite ends of the timing mark 18 are detected from changes in magnetic resistance in the magnetic path passing through the iron core of the coil 17. Alternatively the timing mark 18 may be formed from permanent magnets fixed on the flywheel 15 at positions a given angle away from each other, and the sensor may be a magnetic sensor such as a Hall element for detecting passage of the permanent magnets. Alternatively, the mark may be a slit, which may be detected optically with an LED and a light receiving element.

As seen in FIG. 2, the electronic circuit 27 comprises the rotational speed detection section 29, the degree-of-rotational variation detection section 31 and the output restriction judgment section 32, as already noted. The electronic circuit 27 further comprises an ignition timing determination section 33, an output restriction section 34 and other components, some of which will be described. At least one of these circuits 29, 31–34 can be formed by the software of a microcomputer.

The output signal of the sensor 17, that is, the positive or negative pulse outputted after detection of the forward and rearward ends 19, 21 of the projection 18, is inputted into the rotational speed detection section 29, where a rotational speed N (rpm) is determined from the time interval between successive two positive pulses or two negative pulses. The output pulse of the sensor 17 is inputted into the degree-of-rotational variation detection circuit 31, where the degree of rotational variation R is determined.

Figure 4:
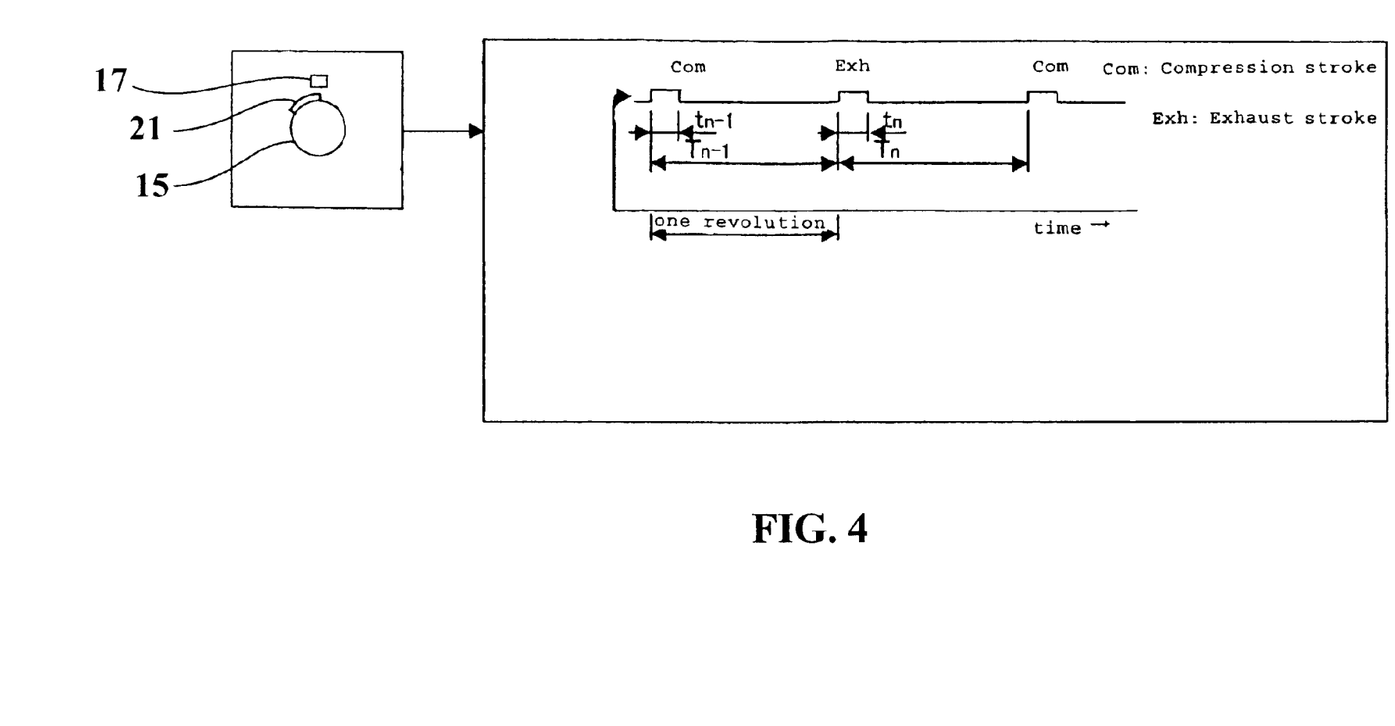
FIG. 4 is a schematic view showing the method of determining shaft acceleration in accordance with the invention.

A manner in which the degree of rotational variation can be obtained will now be described by reference to FIG. 4. The degree-of-rotational variation detection section 31 measures the time interval "D" from the forward end 19 to the rear end 21 of the projection 18 as being tn–1 for the compression stroke and tn for the subsequent exhaust stroke. Also determined is a length of time "T" for the crankshaft 16 to makes one revolution by measuring the time interval between successive positive (or negative) pulses. Here, the period on the compression stroke is represented by Tn–1, and the period on the exhaust stroke by Tn.

A first method of determining the degree of rotational variation R is one in which a ratio t/T of detection time t of the projection to the period T is determined, and the ratio (t/T)=R represents the degree of rotational variation. A second method of determining the degree of rotational variation R is one in which ratios (t/T) obtained by the first method are determined for the compression stroke and the exhaust stroke, and the difference between them represents the degree of rotational variation. That is, a difference (Rn−1 Rn)=D between a ratio (tn−1/Tn−1)=Rn−1 on the compression stroke and a ratio (tn/Tn)=Rn on the exhaust stroke is determined for each compression or exhaust stroke.

The output restriction judgment section 32 compares the degree of rotational variation R (or D) obtained in the degree-of-rotational variation detection section 31, with a set value stored in advance. If R (or D) exceeds the set value, an output restriction signal Q is outputted. The output restriction section 34 controls the engine to restrict its output, based on the output restriction signal Q. In this embodiment, since ignition timing is delayed to restrict engine output, delayed angle β is calculated.

The delayed angle β may be a fixed value or a variable related to the operating conditions such as rotational speed N or some other running condition. For example, the delayed angle β is increased during high speed rotation, and decreased during low speed rotation. The ignition timing determination section 33 determines an ignition timing α at the time of normal operation, subtracts the delayed angle β to obtain (α−β), and outputs an ignition signal P with (α−β) as an ignition timing. The ignition circuit 23 generates ignition sparks based on the ignition signal P at the ignition plug 13.

The ignition timing determination section 33 may determine the ignition timing α based on rotational speed N or on a combination of rotational speed and load from a map. The load may be obtained from the amount of rotational movement of a throttle control (lever), that is, throttle valve opening, or based on the degree of rotational variation R (or D).

Figure 5:
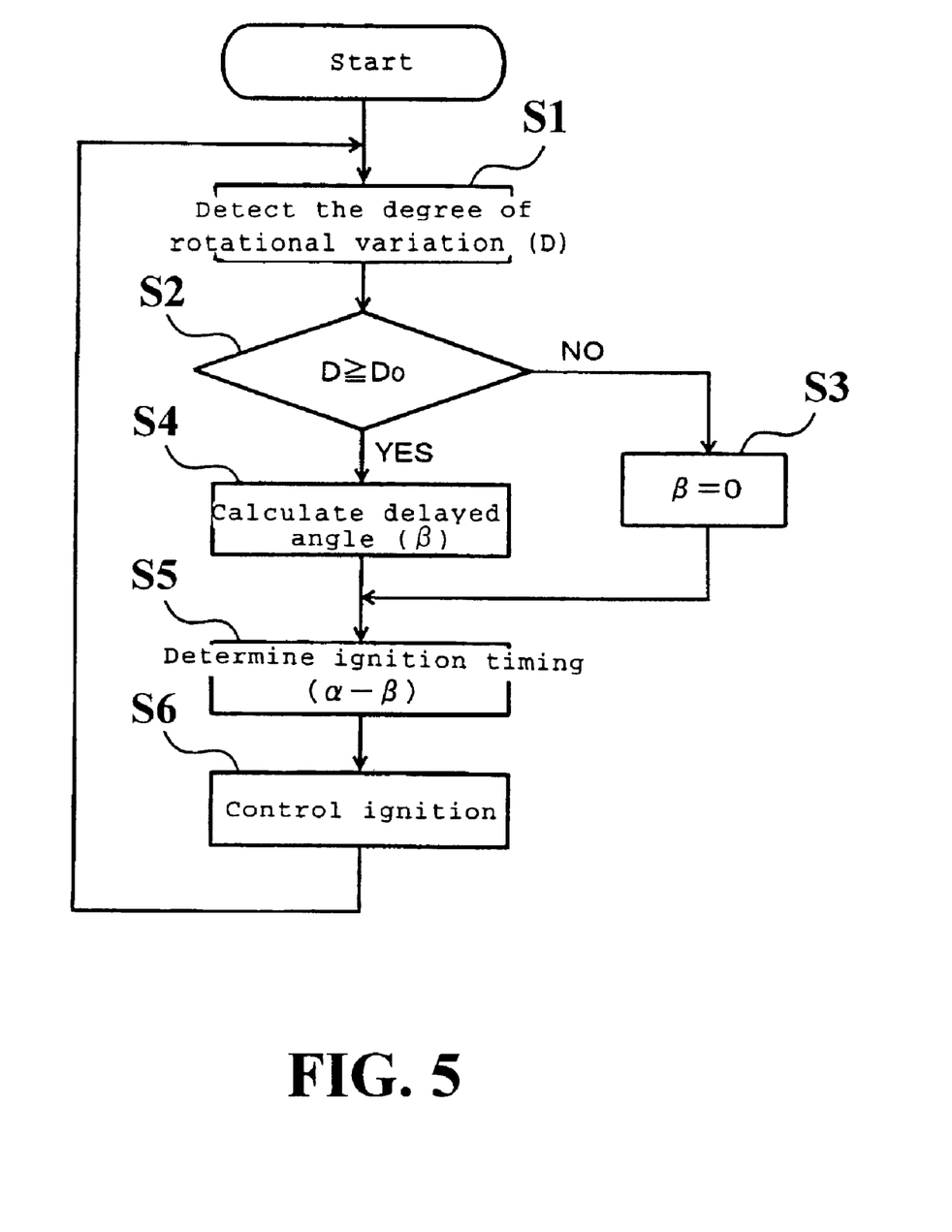
FIG. 5 is a block diagram showing a control routine, which may be utilized to practice the invention.

The control routine of this embodiment will generally be described with reference to FIG. 5. First, at the step S1 the degree-of-rotational variation detection circuit 31 detects a degree-of-rotational variation, either D or R as noted above. Then at the step S2 the output restriction judgment section 32 of the electronic circuit 27 compares this degree of variation D with a set value D0. If D<D0, the output restriction signal Q is not outputted. Thus at the step S3 the output control section 34 sets the delayed angle β to zero.

Figure 6:
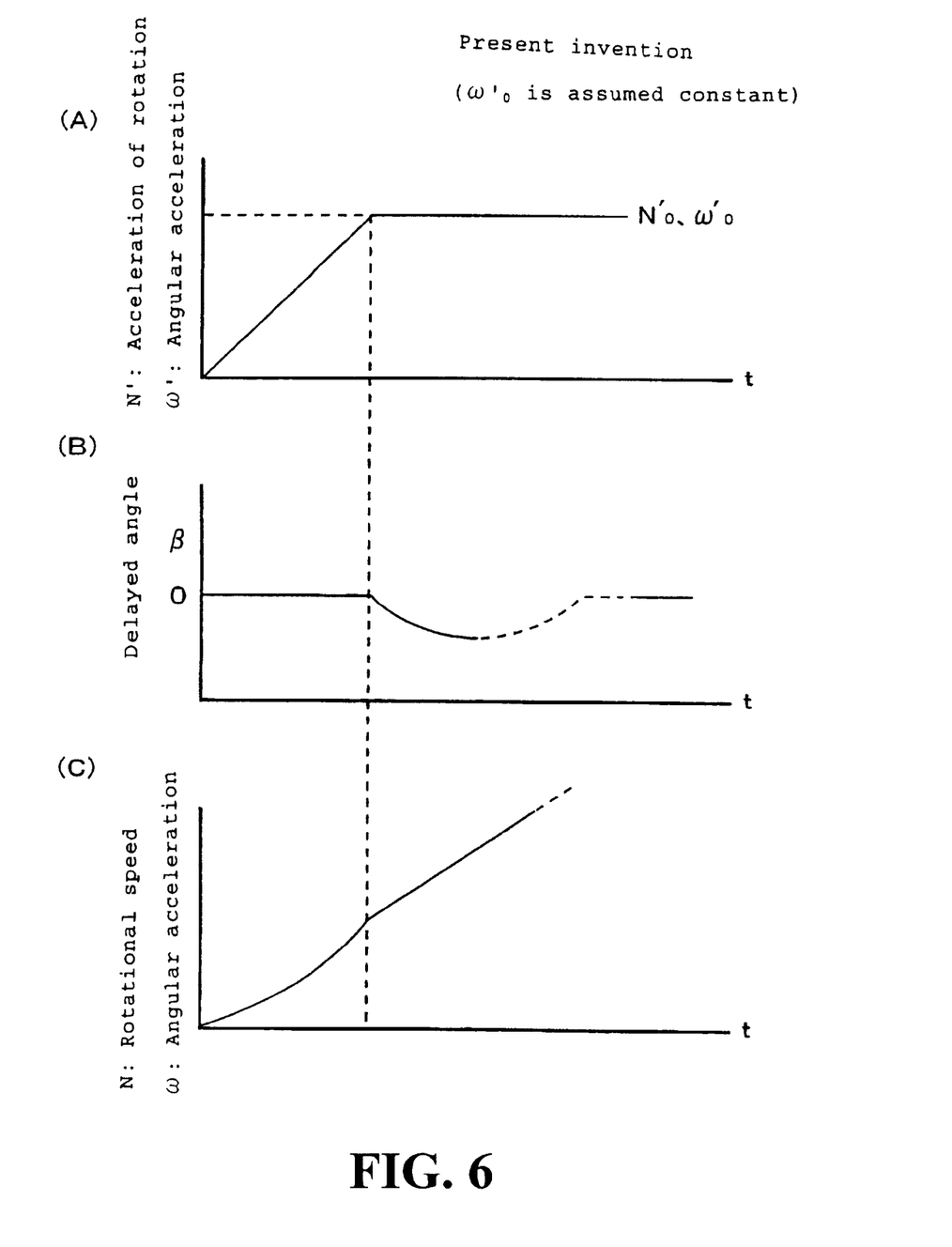
FIG. 6 is a graphical view in part similar to FIG. 1, but shows the performance in accordance with the invention.

If D is not less than D0, the output restriction signal Q is outputted and at the step S4 the output restriction section 34 calculates a delayed angle β. Then at the step S5 the ignition timing determination circuit 33 determines an ignition timing (α−β) using this delayed angle and the rotational speed N. The circuit sends an ignition signal P corresponding to the ignition timing (α−β) to generated ignition sparks at the ignition plug 13 at the step S6. The program then repeats until D is less than D0. The effect of this operation is shown in FIG. 6, which should be compared with the prior art method in FIG. 1.

The rotational acceleration N' (angular acceleration ω') at the time when the degree of rotational variation D (or R) coincides with a set value D0, is stored in a memory, and thereafter, the delayed angle β is feedback controlled such that the rotational acceleration N'0 (ω'0) is constant. Thus, the acceleration is constant during accelerating operation, so that a smooth acceleration feeling can be achieved.

Figure 7:
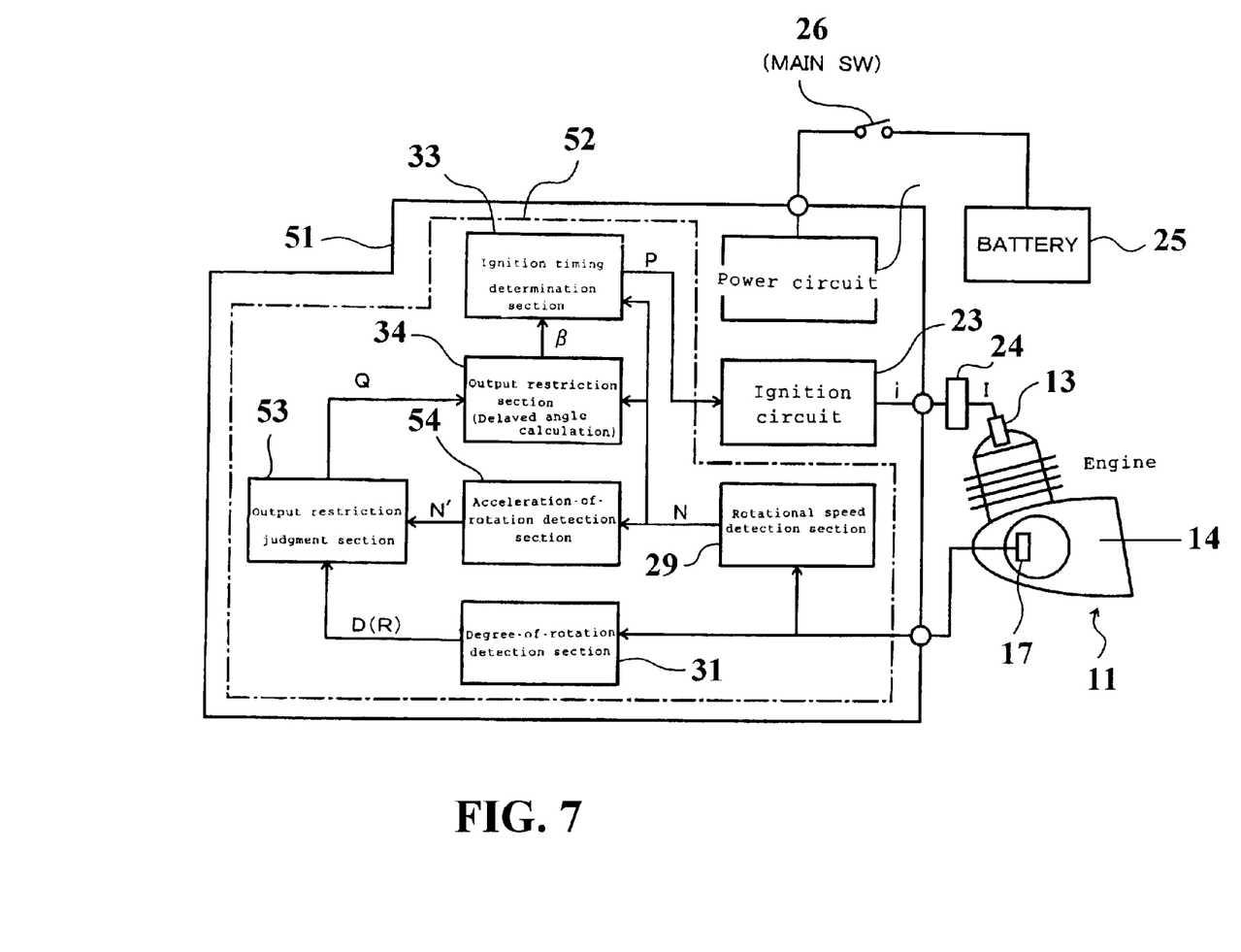
FIG. 7 is a schematic view, in part similar to FIG. 2, showing an engine control constructed and operated in accordance with another embodiment of the invention.

FIG. 7 is a block diagram of another embodiment. Where components of this embodiment are the same as those of the first embodiment they are designated by the same reference numerals and will be described again only where necessary to understand and utilize this embodiment. In this embodiment, an ignition timing control 51 employs a timing control circuit 52 having many of the same components as the first embodiment. However an output restriction judgment section 53 judges whether or not output restriction is performed using the degree of rotational variation D (or R) and the rotational acceleration N'. Thus a rotational acceleration detection section 54 is provided for obtaining the rotational acceleration N' (or angular acceleration ω') by calculating the derivative of the rotational speed N to time.

In this embodiment, output restriction is performed, based on a judgment that both the degree of rotational variation D (or R) and the rotational acceleration N' (or ω') become larger than the respective set values, so that an operating condition in which engine output restriction is needed, can be judged more exactly. For example, in the case of downward slope starting, the acceleration becomes excessive even if the throttle grip is moved slowly, or moved quickly from the closed position to a half-open position or from a half-open position to the full-open position, but the degree of rotational variation is small because of low load, and thus engine output restriction can be avoided.

Thus, from the foregoing description it should be readily apparent that the described embodiments provide much more effective engine output control to avoid undesirable vehicle conditions than the prior art methods. Of course, the foregoing description is that of preferred embodiments of the invention and various changes and modifications may be made without departing from the spirit and scope of the invention as defined by the appended claims.

What is claimed is:

1. A transient engine control method for a vehicle in which rotation of an internal combustion engine is transmitted to a driven wheel through a transmission utilizing the output of only a single sensor, said method comprising the steps of detecting during engine acceleration variations in the rotational state of a shaft during only a portion of a single rotation from the output of the single sensor, determining if the degree of change in rotational state variation is excessive, and restricting engine output if the degree of change in rotational state of a shaft is excessive.

2. An engine control method for a vehicle as set forth in claim 1 wherein the degree of change in rotational state of the engine rotational state is determined by measuring shaft speed on successive rotations.

3. An engine control method for a vehicle as set forth in claim 1 wherein the degree of change in rotational state of the engine rotational state is determined by measuring shaft speed during a portion of shaft rotation during successive cycles.

4. An engine control method for a vehicle as set forth in claim 3 wherein the successive cycles are a compression cycle and an exhaust cycle in a four cycle engine.

5. An engine control method for a vehicle as set forth in claim 1 wherein the degree of change in rotational state of the engine rotational state is both degree of rotational variation and rotational acceleration.

6. An engine control method for a vehicle as set forth in claim 1 wherein the degree of change in rotational state of the engine rotational state is determined by measuring the time interval during a fixed degree of shaft rotation and for a complete rotation including the measured fixed degree of shaft rotation.

7. An engine control method for a vehicle claim 1 wherein the engine output is varied by changing the spark timing.

8. An engine control method for a small vehicle as set forth in claim 7, wherein spark timing is changed by a time set in a timer.

9. An engine control method for a small vehicle according to claim 7, wherein the change of spark timing is feedback controlled such that acceleration of engine revolution will not exceed a set value.

10. A vehicle comprised of an internal combustion engine, a transmission driven by said engine, a driven wheel driven by said transmission, and an engine control comprised of a single sensor for detecting during engine acceleration variations in the rotational state of a shaft, determining if the degree of change in rotational state variation is excessive from the output of said single sensor, and restricting engine output if the degree of change in rotational state of said shaft is excessive.

11. A vehicle as set forth in claim 10 wherein the engine control determines the degree of change in rotational state of the engine rotational state by measuring shaft speed on successive rotations.

12. A vehicle as set forth in claim 10 wherein the engine control determines the degree of change in rotational state of the engine rotational state by measuring shaft speed during a portion of shaft rotation during successive cycles.

13. A vehicle as set forth in claim 12 wherein the successive cycles are a compression cycle and an exhaust cycle in a four cycle engine.

14. A vehicle as set forth in claim 10 wherein the engine control determines the degree of change in rotational state of the engine rotational state is both degree of rotational variation and rotational acceleration.

15. A vehicle as set forth in claim 10 wherein the engine control determines the degree of change in rotational state of the engine rotational state by measuring the time interval during a fixed degree of shaft rotation and for a complete rotation including the measured fixed degree of shaft rotation.

16. A vehicle as set forth in claim 15 wherein the engine output is varied by changing the spark timing.

17. A vehicle as set forth in claim 16 wherein the spark timing is changed by a time set in a timer.

18. A vehicle as set forth in claim 16 wherein the spark timing is feedback controlled such that acceleration of engine revolution will not exceed a set value.

19. An engine control method for a vehicle in which rotation of a four cycle internal combustion engine is transmitted to a driven wheel through a transmission utilizing the output of only a single sensor, said method comprising the steps of detecting during engine acceleration variations in the rotational state of a shaft by measuring shaft speed on successive rotations containing a compression cycle and an exhaust cycle, determining if the degree of change in rotational state variation is excessive, and restricting engine output if the degree of change in rotational state of a shaft is excessive.

20. An engine control method for a vehicle as set forth in claim 19 wherein the degree of change in rotational state of the engine rotational state is determined by measuring shaft speed during a portion of shaft rotation.

21. A vehicle comprised of a four cycle internal combustion engine, a transmission driven by said engine, a driven wheel driven by said transmission, and an engine control for detecting during engine acceleration variations in the rotational state of a shaft by measuring shaft speed on successive rotations containing a compression cycle and an exhaust cycle, determining if the degree of change in rotational state variation is excessive, and restricting engine output if the degree of change in rotational state of said shaft is excessive.

22. A vehicle as set forth in claim 21 wherein the engine control determines the degree of change in rotational state of the engine rotational state by measuring shaft speed during a portion of shaft rotation.

* * * * *